(12) United States Patent
Kikuchi

(10) Patent No.: US 6,426,842 B1
(45) Date of Patent: Jul. 30, 2002

(54) TAPE TRAVEL CONTROLLING APPARATUS FOR USE WITH DATA RECORDER

(75) Inventor: Akihiro Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 927 days.

(21) Appl. No.: 08/602,366

(22) Filed: Feb. 16, 1996

(30) Foreign Application Priority Data

Feb. 20, 1995 (JP) .............................................. 7-055013

(51) Int. Cl.[7] .............................................. G11B 5/596
(52) U.S. Cl. ...................................... 360/72.2; 360/74.1
(58) Field of Search .............................. 360/69, 70, 71, 360/72.1, 72.2, 72.3, 73.01, 73.11, 73.14, 74.4, 73.02

(56) References Cited

U.S. PATENT DOCUMENTS

| | | | | |
|---|---|---|---|---|
| 4,499,509 A | * | 2/1985 | Gohda et al. | 360/72.1 |
| 4,511,937 A | * | 4/1985 | Guerrero | 360/72.1 |
| 4,958,244 A | * | 9/1990 | Inazawa et al. | 360/72.1 |
| 4,991,036 A | * | 2/1991 | O'Brien | 360/72.1 X |
| 5,359,472 A | * | 10/1994 | Motohashi | 360/72.2 |
| 5,384,673 A | * | 1/1995 | Yoshioka et al. | 360/72.2 |
| 5,388,016 A | * | 2/1995 | Kanai et al. | 360/72.3 |
| 5,471,352 A | * | 11/1995 | Fujita et al. | 360/72.2 |
| 5,602,649 A | * | 2/1997 | Shin | 360/72.1 X |

\* cited by examiner

Primary Examiner—David Hudspeth
Assistant Examiner—K. Wong
(74) Attorney, Agent, or Firm—Frommer Lawrence & Haug LLP; William S. Frommer

(57) ABSTRACT

A tape controlling apparatus for use with a data recorder for recording and/or reproducing digital data on and/or from a tape-shaped recording medium. A target position signal for representing a target position to which the tape-shaped recording medium is traveled, a first command signal for representing a position traveling request and a second command signal for representing a write request or a read request are provided. Information of the target position of the medium is detected from the traveling position signal and stored. The difference between the present position of the medium and the stored target position is compared with a predetermined value, resulting in a control signal for driving the tape-shaped recording medium to a particular position between the present position and the target position when the difference is larger than the predetermined value. When the first command and the control signal are present, the medium is driven to the particular position between the present and target positions and then driven from the particular position to the target position.

10 Claims, 20 Drawing Sheets

*Fig. 12*

CONTENTS OF SUB-CODE AREA

| WORD BYTE | (MSB) BYTE3 | BYTE2 | BYTE1 | (LSB) BYTE0 |
|---|---|---|---|---|
| 0 | ID | | | |
| 1 | A | LOGICAL ID | | |
| 2 | FILE NO. | | | |
| 3 | C | VALID BLOCK TABLE COUNT | | |
| 4 | INITIAL NO. | | | |
| 5 | OVERWRITE COUNTER | | | |
| 6 | W | WRITE RETRY COUNT | | |
| 7 | DRIVE SERIAL NO. | | | |
| 8 | ROM VERSION | | | |
| 9~13 | LOGICAL VOLUME NO. | | | |
| 14 | TAPE INITIAL NO. | | | |
| 15 | TAPE OVERWRITE COUNTER | | | |
| 16 | LIDT AVAILABLE FLAG | | | |
| 17 | BLOCK OPERATION TYPE | | | |
| 18 | FORMAT TYPE | | | |
| 19 | CREATE TIME | | | |
| 20 | MOUNT NUMBER | | | |
| 21 | NUMBER OF READ RETRIES | | | |
| 22 | TOTAL NUMBER OF RECOVERIES | | | |
| 23 | RECOVERY FAILURE FLAG | | | |
| 24~33 | RESERVED | | | |

Fig. 13

CONTENTS OF BLOCK MANAGEMENT TABLE

| BYTE \ WORD | (MSB) BYTE3 | BYTE2 | BYTE1 | (LSB) BYTE0 |
|---|---|---|---|---|
| 0~3 | ABSOLUTE BLOCK NO. OF DATA MANAGED BY TABLE | | | |
| | TOP ADDRESS OF DATA AREA OF DATA MANAGED BY TABLE | | | |
| | L | S | NUMBER OF BYTES OF VALID DATA OF DATA MANAGED BY TABLE | |
| | TOTAL NUMBER OF BYTES OF BLOCK | | | |

Fig. 14

CONTENTS OF VIT

| WORD BYTE | (MSB) BYTE3 | BYTE2 | BYTE1 | (LSB) BYTE0 |
|---|---|---|---|---|
| 0~3 | RESERVED ( = 00000000)) | | | |
| 4~43 | VOLUME LABEL | | | |
| 44 | TOP PHISICAL ID OF DATA BLOCK ( = TOP ID OF USER AREA) | | | |
| 45 | LAST PHISICAL ID OF DATA BLOCK ( = POSITION OF EOD) | | | |
| 46 | LAST ABN OF DATA BLOCK ( = ABN CORRESPONDING TO EOD) | | | |
| 47~64 | RESERVED ( = 00000000)) | | | |
| 65 | UIT AVAILABLE FLAG ( ALL "0s" OR "1s" ) | | | |
| 66~254 | RESERVED ( = 00000000)) | | | |
| 255 | VOLUME NO. UPON INITIALIZATION | | | |
| 256 | OVERWRITE COUNTER | | | |
| 257 | LIDT AVAILABLE FLAG ( = ffffffff) | | | |
| 258 | BLOCK OPERATION TYPE ( = ffffffff) | | | |
| 259 | FORMAT TYPE ( = 00000001) | | | |
| 260 | ECC TYPE ( = 00000002) | | | |
| 261 | VOLUME CREATION TIME ( = 00000000) | | | |
| 4096 | UIT TYPE ( = 00000001) | | | |
| 8192~8215 | MOUNT INFORMATION | | | |
| 16384 | TOTAL NUMBER OF TIMES OF READ RETRY | | | |
| 16385 | TOTAL NUMBER OF TIMES OF RECOVERY | | | |
| 16386 | RECOVERY FAILURE FLAG ( = 00000000) | | | |

Fig. 15

CONTENTS OF LIDT

| BYTE＼WORD | (MSB) BYTE3 | BYTE2 | BYTE1 | (LSB) BYTE0 |
|---|---|---|---|---|
| 0~3 | ADDRESS OF LOGICAL ID ||||
| | ADDRESS OF PHISICAL ID ||||
| | FILE NO. ||||
| | ABSOLUTE BLOCK NO. ||||

Fig. 16

CONTENTS OF FIT

| BYTE＼WORD | (MSB) BYTE3 | BYTE2 | BYTE1 | (LSB) BYTE0 |
|---|---|---|---|---|
| 0~1 | ADDRESS OF PHISICAL ID OF TAPE MARK #1 ||||
| | ABSOLUTE BLOCK NO. OF TAPE MARK #1 ||||
| | RESERVED ( = 00000000) ||||
| | ADDRESS OF PHISICAL ID OF TAPE MARK #2 ||||
| | ABSOLUTE BLOCK NO. OF TAPE MARK #2 ||||
| | RESERVED ( = 00000000) ||||
| ~ | ~ ||||
| P,Q | ADDRESS OF PHISICAL ID OF TAPE MARK #N ||||
| | ABSOLUTE BLOCK NO. OF TAPE MARK #N ||||
| ~ | ~ ||||
| Z | RESERVED ( = 00000000) ||||

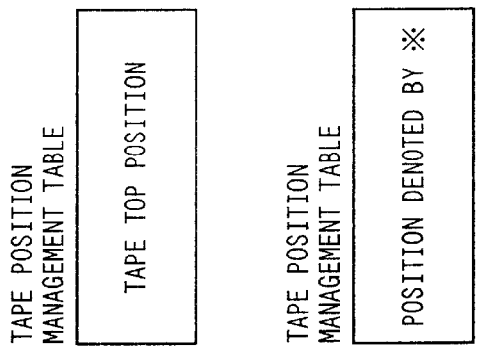
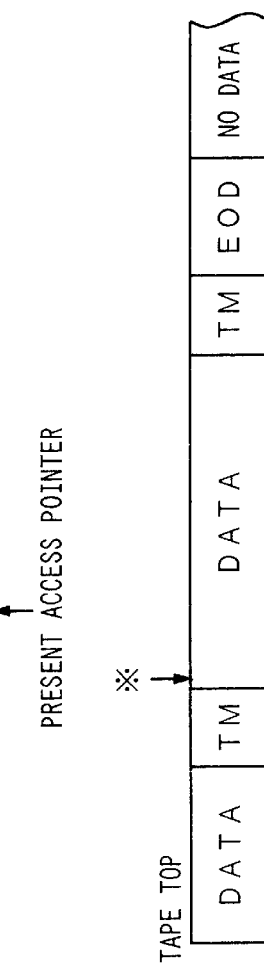
Fig. 18A
Fig. 18B
Fig. 18C
Fig. 18D

Fig. 22A

TAPE TOP | DATA | TM | DATA | TM | EOD | NO DATA

PRESENT ACCESS POINTER (pointing into DATA)

Fig. 22B

TAPE TOP | DATA | TM | DATA | TM | EOD | NO DATA

PRESENT ACCESS POINTER (at TAPE TOP)

Fig. 22C

TAPE TOP | DATA | TM | DATA | TM | EOD | NO DATA

PRESENT ACCESS POINTER (pointing at first TM)

Fig. 22D

TAPE TOP | DATA | TM | DATA | TM | EOD | NO DATA

PRESENT ACCESS POINTER (pointing at first TM)

TAPE TRAVEL CONTROLLING APPARATUS FOR USE WITH DATA RECORDER

BACKGROUND OF THE INVENTION

1. Field of the Invention

The present invention relates to a tape travel controlling apparatus for use with, for example, a helical scan type data recorder for recording digital data as helical tracks on a magnetic tape with a rotating head.

2. Description of the Prior Art

As an external data storage unit for use with a computer or the like, a magnetic tape unit is known. As an example of the magnetic tape unit, a helical scan type unit that records digital data on a cassette tape with a rotating head is known. Whenever the magnetic tape unit receives a position traveling request from a host computer, the magnetic tape unit should travel the tape so as to detect the top position of data to be written or read. Hereinafter, the operation for detecting the top position of desired data (or file) is referred to as a top position detecting operation.

Next, with reference to FIGS. 22A, 22B, 22C, and 22D, the top position detecting operation used in a conventional data recorder will be described. FIGS. 22A, 22B, 22C, and 22D show an example of a tape on which two files are recorded. At the last end position of each file, a TM (Tape Mark) that represents a delimiter of a file is recorded. The last TM of the second file is followed by an EOD (end of data) that represents the last end position of data.

FIG. 22A shows data positions on a tape in the state just after the tape has been just loaded into the data recorder. Thus, the position of the access pointer (that is the head position) is unknown.

When the host computer sends a rewind request to the data recorder, it performs a rewind operation. In other words, as shown in FIG. 22B, the data recorder returns the access pointer to the tape top position as a first access operation to the tape. After the data recorder has rewound the tape, the data recorder stops traveling the tape and sends an acknowledge signal to the host computer.

Thereafter, the data recorder receives a top position detecting request from the host computer. For example, the data recorder receives from the host computer a request for skipping one TM (namely, the data recorder receives from the host computer a top position detecting request for detecting the second file). Thus, the data recorder searches a TM on the tape. When the data recorder detects a TM on the tape, it stops traveling the tape and sends an acknowledge signal to the host computer. In such a manner, the data recorder accesses the tape twice. When the data recorder receives a read request from the host computer, the data recorder starts reading data from the position of the access pointer.

Thus, when the top position detecting operation is performed for the read/write operations, a rewind operation for returning the tape to the tape top position and a forward operation for traveling the tape to a desired position are required. Consequently, since the tape is often traveled and a long access time is required, the tape tends to be damaged.

OBJECTS AND SUMMARY OF THE INVENTION

Thus, an object of the present invention is to provide a data recorder that reduces the number of tape traveling operations, that quickly accesses desired data on a tape, and that satisfactorily prevents the tape from being damaged.

Another object of the present invention is to provide a data recorder that prevents a time-out error from taking place in the case that a tape is traveled for a long distance between the present position and a target position and thereby it takes a long time.

The present invention is a tape travel controlling apparatus for use with a data recorder for recording and/or reproducing digital data on and/or from a tape-shaped recording medium, comprising a controlling means for providing a target position signal for representing a target position to which the tape-shaped recording medium is traveled, a first command signal for representing a position traveling request for the tape-shaped recording medium, and a second command signal for representing a write request or a read request for the tape-shaped recording medium, a storing means for detecting information of the target position of the tape-shaped recording medium from the traveling position signal and for storing the information when the first command signal and the target position signal are provided, a detecting means for detecting the present position of the tape-shaped recording medium and for outputting a present position signal for representing the present position of the tape, a comparing means for comparing the difference between the present position and the target position stored in the storing means with a predetermined value and for outputting a control signal for traveling the tape-shaped recording medium to a particular position between the present position and the target position when the difference is larger than the predetermined value, and a driving means for traveling the tape-shaped recording medium to the particular position between the present position and the target position when the first command and the control signal are provided and for traveling the tape-shaped recording medium from the particular position to the target position.

A target position mark is written on a tape position management table in a memory. Only when a write request or a read request is received, the tape is actually traveled. Thus, the traveling of the tape can be minimized. Consequently, the top position detecting operation can be quickly performed and the tape damage can be reduced. When the present access position is far from a target position, the tape is traveled beforehand so that the access position approaches the target position. Thus, a time-out error can be prevented.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 12 is a schematic diagram showing the contents of a sub-code area of the DIT;

FIG. 13 is a schematic diagram showing the contents of a block management table of the DIT;

FIG. 14 is a schematic diagram showing the contents of the VIT in the DIT;

FIG. 15 is a schematic diagram showing the contents of an LIDT in the DIT;

FIG. 16 is a schematic diagram showing the contents of an FIT in the DIT;

FIGS. 18A, 18B, 18C and 18D are schematic diagrams for explaining a top position detecting operation of a data recorder that has been proposed;

FIGS. 22A, 22B, 22C and 22D are schematic diagrams for explaining a top position detecting operation of a conventional data recorder.

DESCRIPTION OF THE PREFERRED EMBODIMENTS

Figure 1:
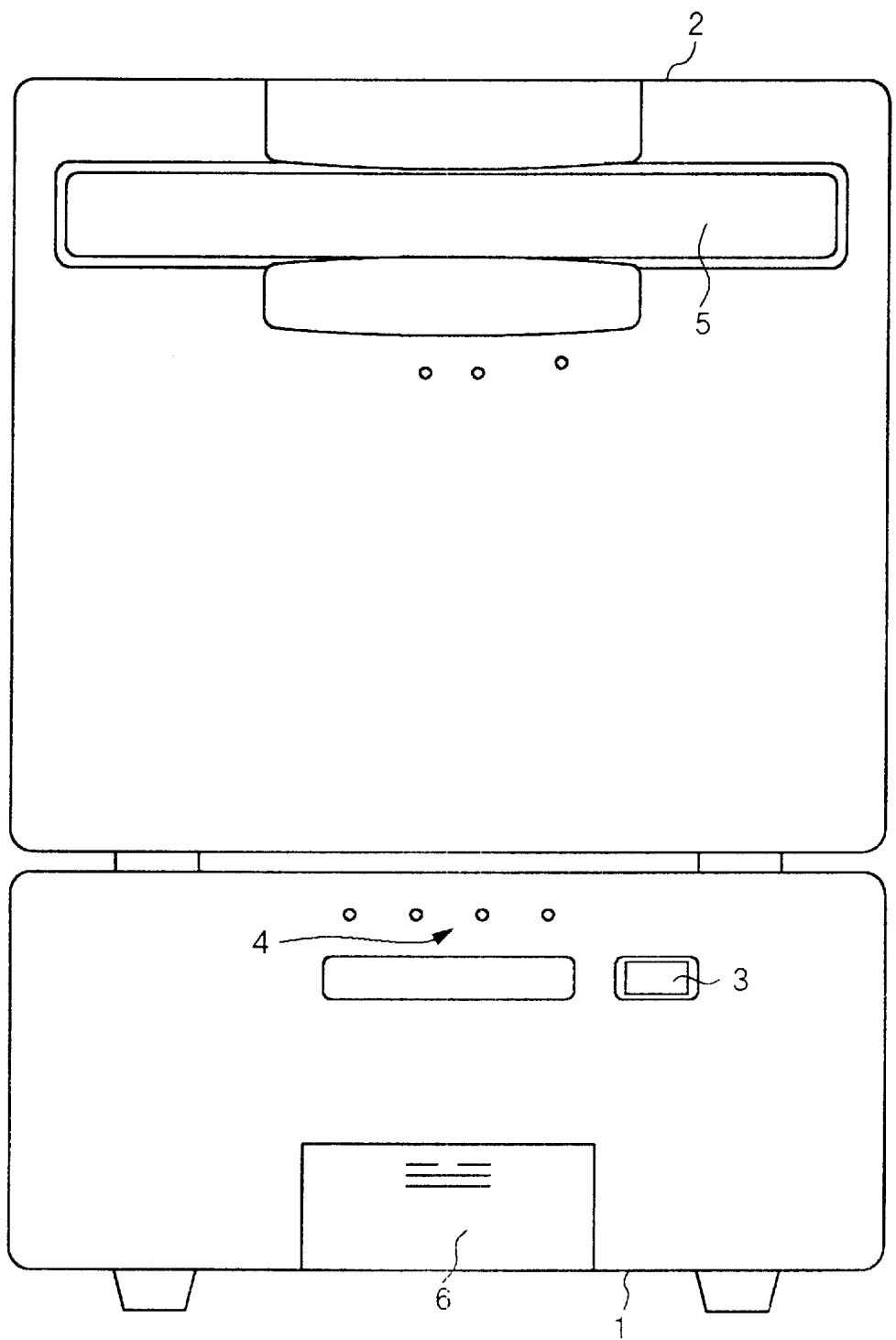
FIG. 1 is a front view schematically showing a data recorder according to the present invention.
Figure 2:
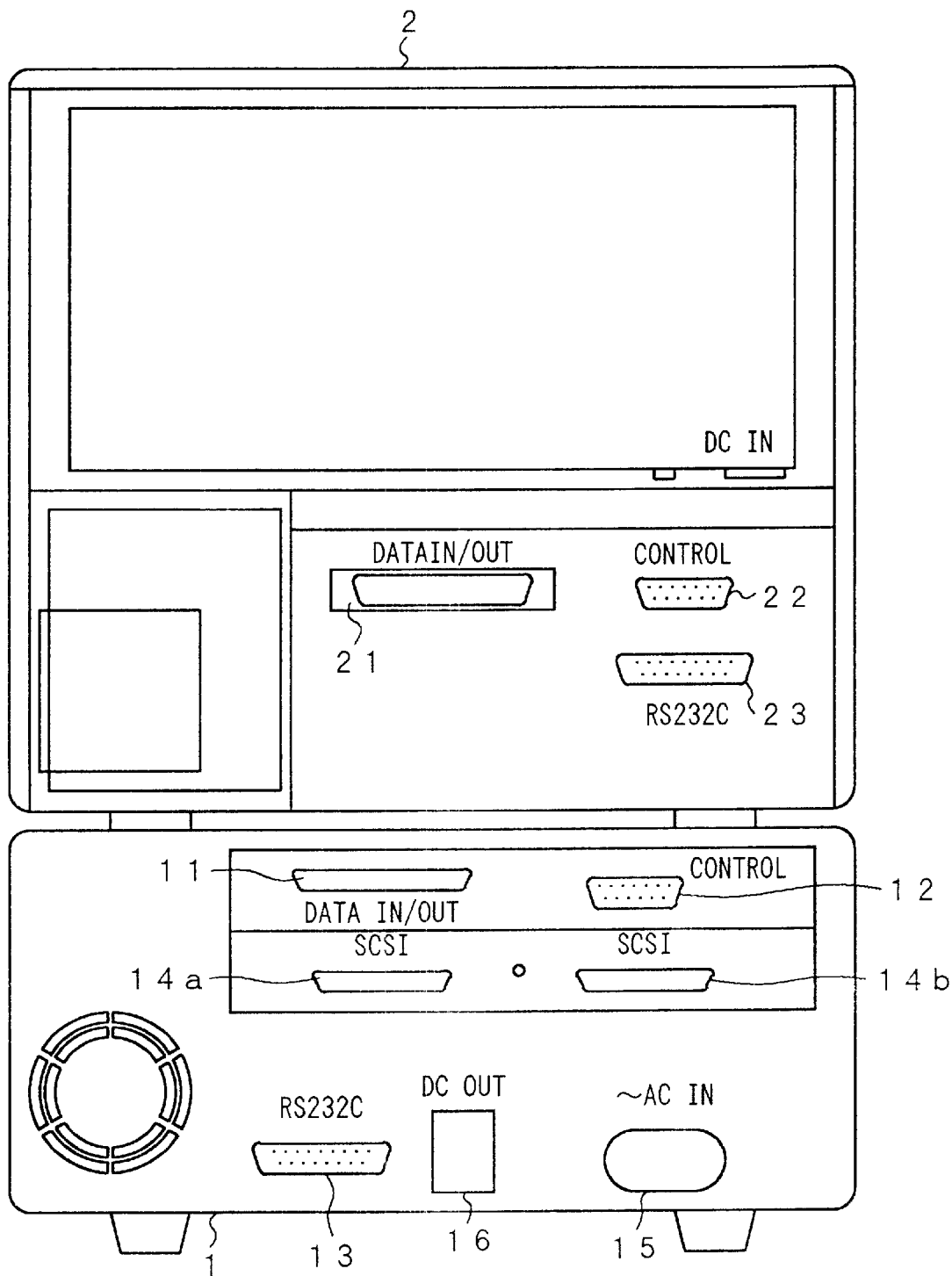
FIG. 2 is a rear view schematically showing the data recorder according to the present invention.

Before explaining embodiments of the present invention, a data recorder according to the present invention will be described. The data recorder records/reproduces digital data to/from a cassette tape with a rotating head. FIG. 1 is a front view showing the data recorder. FIG. 2 is a rear view of the data recorder.

As shown in FIGS. 1 and 2, the data recorder is composed of two units that are an upper unit and a lower unit. The lower unit is literally disposed below the upper unit. The lower unit is a tape drive controller 1. The upper unit is a digital information recorder 2. The tape drive controller 1 has a front panel that includes a button 3 and a plurality of light emitting diodes 4. The button 3 is used to perform the loading/unloading processes for a cassette tape. The light emitting diodes 4 represent whether or not a cassette tape has been loaded, whether or not the power has been turned on, and so forth. The digital information recorder 2 has a front panel with a cassette tape loading/unloading opening 5. In addition, the digital information recorder 2 has a detachable panel 6. Inside the detachable panel 6, other operation buttons are disposed.

As shown in FIG. 2, on the rear panels of the tape drive controller 1 and the digital information recorder 2, a plurality of connectors are disposed. On the rear panel of the lower tape drive controller 1, a data input/output connector 11, a control connector 12, an RS232C connector 13, two SCSI connectors 14 and 14b, an AC power input connector 15, and a DC power output connector 16 are disposed.

On the rear panel of the digital information recorder 2, a data input/output connector 21, a control connector 22, and an RS232C connector 23 are disposed. By connecting a dedicated cable to the DC power output connector 16 of the tape drive controller 1, power is supplied to the digital information recorder 2. The data input/output connectors 11 and 21 are connected with a dedicated cable. Data is sent and received between the controller 1 and the recorder 2. The control connectors 12 and 22 are connected with a dedicated cable. Thus, control signals are exchanged between the controller 1 and the recorder 2. The RS232C connectors 13 and 23 are used for diagnosis purposes.

Figure 3:
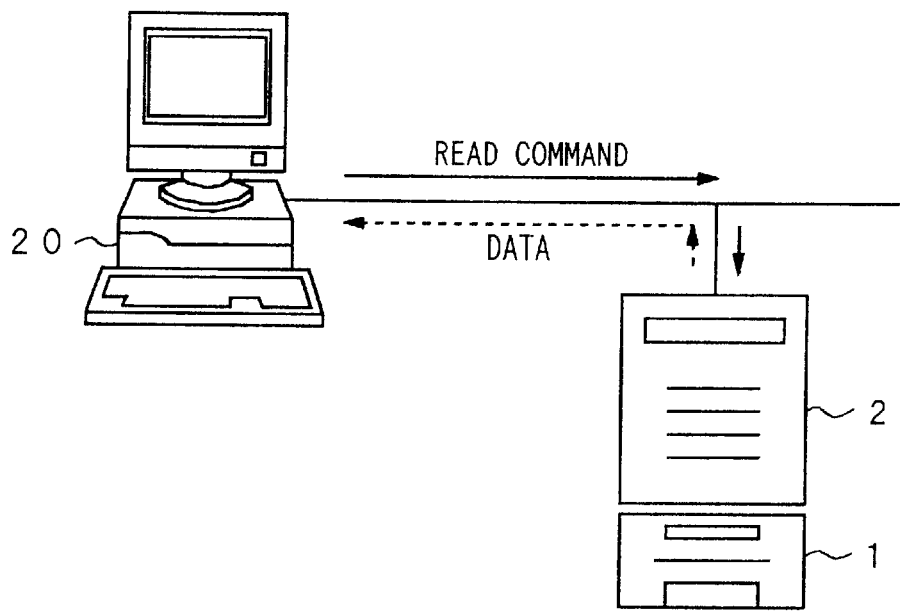
FIG. 3 is a schematic diagram showing an example of an application of the data recorder according to the present invention.

As shown in FIG. 3, when a host computer 20 is connected to the data recorder, the SCSI connectors 14a and 14b are used. When the host computer 20 sends for example a read command to the data recorder, it outputs data to the host computer 20.

Figure 4:
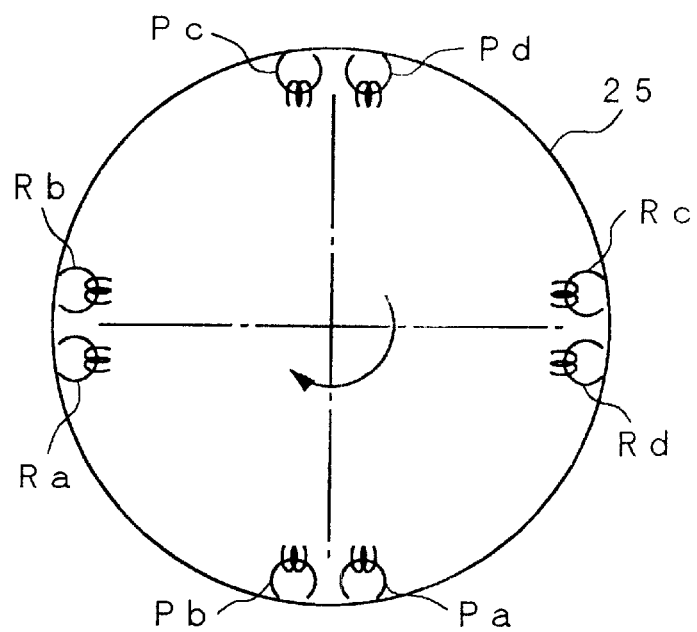
FIG. 4 is a schematic diagram showing a head arrangement of the data recorder according to the present invention.

The digital information recorder 2 records/reproduces data to/from a cassette tape with rotating heads. (In the following description, the rotating heads may be treated as a single head for convenience.) FIG. 4 shows the arrangement of the heads used in the recorder 2. Four record heads Ra, Rb, Rc, and Rd and four reproduction (playback) heads Pa, Pb, Pc, and Pd are disposed on a drum 25 that rotates at a predetermined speed in the direction shown in FIG. 4.

The heads Ra and Rb are adjacently disposed. This relation applies to pairs of heads Rc and Rd, heads Pa and Pb, and heads PC and Pd. The extended directions of each pair of heads are different from each other. The extended directions are referred to as azimuths. Referring to FIG. 4, the heads Ra and Rc are disposed at an interval of 180° and have a first azimuth. The heads Rb and Rd are disposed at an interval of 180° and have a second azimuth. The heads Pa and Pc have the first azimuth. The heads Pb and Pd have the second azimuth. With the different azimuths, cross talks can be prevented between adjacent tracks. Each of the adjacent heads is integrally composed as one head. The integrally composed head is referred to as a double-azimuth head.

A tape (for example, ½ inch wide) that is led out of the cassette is helically wound around the periphery of the drum 25 for an angle range of 180° or greater. The tape is supplied at a predetermined speed. Thus, when a signal is recorded to the tape, in the first half period of one rotation of the drum 25, the heads Ra and Rb scan the tape. In the second half period, the heads Rc and Rd scan the tape. When a signal is reproduced from the tape, in the first period, the heads Pa and Pb scan the tape. In the second period, the heads Pc and Pd scan the tape.

Figure 5:
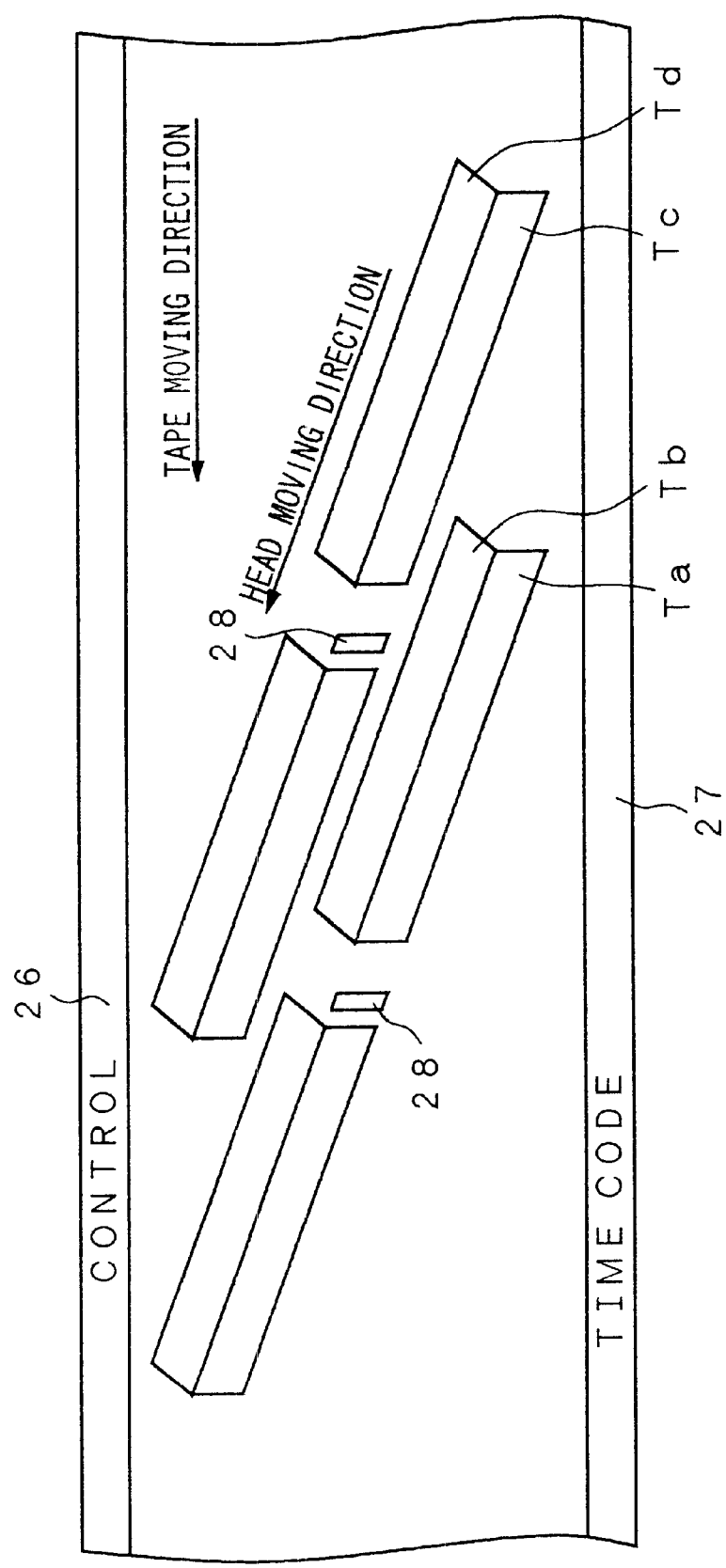
FIG. 5 is a schematic diagram showing track patterns of the data recorder according to the present invention.

FIG. 5 shows a track pattern on the tape of the digital information recorder 2. Longitudinal tracks are disposed in the width direction of the tape. Helical tracks are disposed between the longitudinal tracks. A control signal is recorded on an upper longitudinal track 26. A time code is recorded on a lower longitudinal track 27. The time code represents the position in the longitudinal direction of the tape. For example, the time code is an SMPTE time code. Whenever the drum 25 is rotated, the head Ra and Rb form two helical tracks Ta and Tb at the same time. Thereafter, the heads Ra and Rb form two helical tracks Tc and Td at the same time. On each helical track, a first half portion and a second half portion are separately formed. Between the first half portion and the second half portion of each helical track, a record area 28 is disposed. The record area 28 is used to record a tracking pilot signal.

The SMPTE time code was developed for a video signal for use with a VCR or the like. The minimum unit of the SMPTE time code is a frame (1/30 second). As will be described later, in the data recorder, data that can be recorded on the four tracks Ta to Td shown in FIG. 5 is defined as a logical data unit (referred to as track set). When 16 tracks accord with one frame of a video signal, a sub-digit (values 0, 1, 2, and 3) lower than the digit of the frame of the time code is defined. This time code is also referred as ID.

In the data recorder according to the present invention, the SMPTE time code is composed of four tracks as a track set. Since the SMPTE time code has a user data area, such a modification can be performed.

Figure 6:
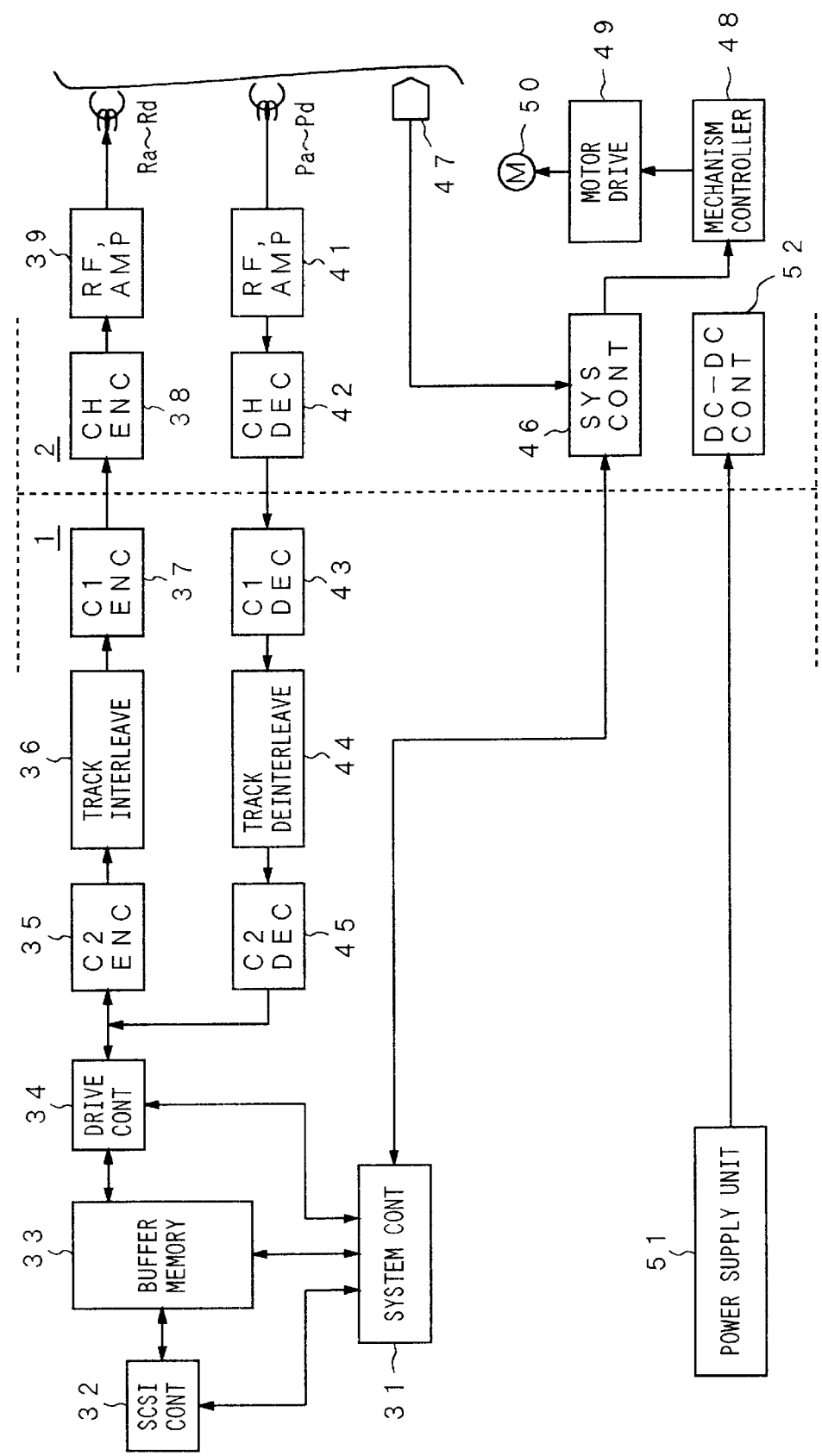
FIG. 6 is a block diagram showing a system structure of the data recorder according to the present invention.

FIG. 6 is an outlined block diagram showing a system structure of the tape drive controller 1 and the digital information recorder 2. The controller 1 has a system controller 31. The system controller 31 has the following functions.

Managing an SCSI controller 32,
Managing a buffer memory 33,
Managing files/tables,
Writing/reading data and controlling retries,
Controlling the digital information recorder 2, and
performing self diagnosis.

The data recorder is connected to the host computer through the SCSI controller 32 of the digital information recorder 2. Data that is read from the buffer memory 33 is supplied to a C2 encoder 35 through the drive controller 34. An output from the C2 encoder 35 is supplied to a C1 encoder through a track interleave circuit 36.

The C2 encoder 35 and the C1 encoder perform an error correction encoding process for record data with a product code. The track interleave circuit 36 controls the distribution of data to tracks so as to improve the error correction performance when the recorder records data onto a magnetic tape.

When data is recorded on the tape, it is recorded as SYNC blocks separated by a synchronous signal. In this case, the track interleave circuit 36 adds a block synchronous signal to the output signal of the C2 encoder 35. The C1 encoder 37 generates a C1 parity. Thereafter, data is randomized and words are interleaved in a plurality of SYNC blocks.

Digital data that is output from the C1 encoder 37 is supplied to the digital information recorder 2. The digital information recorder 2 encodes digital data received from a channel code encoder 38 to a signal suitable for the recording/reproducing processes. The resultant record data is output to the record heads Ra to Rd through an RF amplifier 39. The heads Ra to Rd record the record data on the tape. The RF amplifier 39 performs a process corresponding to partial response class 4 (PR (1, 0, −1) so as to lower the frequency band of the record signal and easily detect a reproduction signal.

Data reproduced from the tape by the reproduction heads Pa to Pd is supplied to a channel code decoder 42 through an RF amplifier 41. The RF amplifier 41 includes a reproducing amplifier, an equalizer, and a Viterbi decoder. The output data of the channel code decoder 42 is supplied to the tape drive controller 1. The output data of the channel code decoder 42 is supplied to a C1 decoder 43.

The C1 decoder 43 is connected to a track deinterleave circuit 44. The track deinterleave circuit 44 is connected to a C2 decoder 45. The C1 decoder 43, the track deinterleave circuit 44, and the C2 decoder 45 perform the reverse processes of the C1 encoder 37, the track interleave circuit 36, and the C2 encoder 35, respectively. The reproduction (read) data received from the C2 decoder 45 is supplied to the buffer memory 33 through the drive controller 34.

The digital information recorder 2 has a system controller 46. In addition, the digital information recorder 2 has a fixed head 47 for the longitudinal tracks on the tape. The head 47 is connected to the system controller 46. The head 47 records/reproduces a control signal and a time code. The system controller 46 is connected to the system controller 31 of the tape drive controller 1 through a bidirectional bus.

A mechanism controller 48 is connected to the system controller 46. The mechanism controller 48 includes a servo circuit that drives a motor 50 through a motor drive circuit 49. The system controller 46 has for example two CPUs. The system controller 46 communicates with the tape drive controller 1, controls recording/reproducing of a time code, controls recording/reproducing timings, and so forth using the CPUs.

The mechanism controller 48 has for example two CPUs. The mechanism controller 48 controls a mechanical system of the digital information recorder 2 with the CPUs. In particular, the mechanical controller 48 controls the rotation of the head and tape system, the tape speed, the tracking operation, loading/unloading processes of the cassette tape, and the tape tension. The motor 50 includes a drum motor, a capstan motor, a reel motor, a cassette mounting motor, a loading motor, and so forth.

The digital information recorder 2 has a DC—DC converting circuit 52 that receives a DC voltage from a power supply unit 51 of the tape drive controller 1. The digital information recorder 2 also has position sensors (such as a tape end detecting sensor), a time code generating/reading circuit, and so forth (that are not shown).

Next, the record format of digital data will be described.

Figure 7:
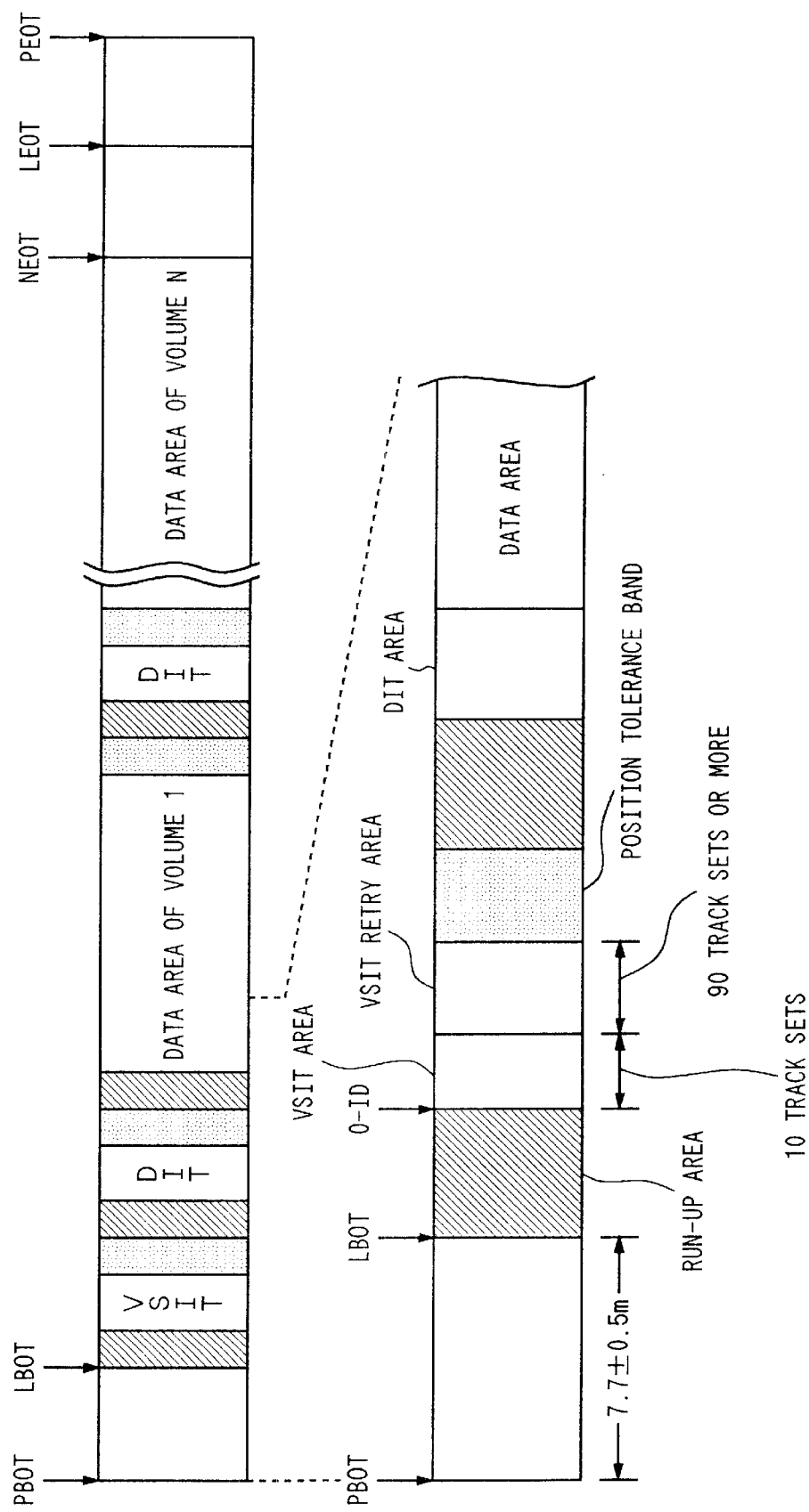
FIG. 7 is a schematic diagram showing a tape format of the data recorder according to the present invention.

FIG. 7 shows the layout of the entire tape (in a cassette, for example). The entire tape is referred to as physical volume. The tape has a leader tape. Between the PBOT (Physical Beginning of Tape) and the PEOT (Physical End of Tape) of a physical tape, a recordable area is between the LBOT (Logical Beginning of Tape) and the LEOT (Logical End of Tape). The recordable area is defined because the tape tends to be damaged at the beginning and end of the tape and thereby the error rates thereof are high. For example, the invalid area between the PBOT and the LBOT is defined 7.7±0.5 m. In addition, the invalid area between the PEOT and LEOT is defined 10 m or greater.

One physical volume has a plurality of logical volumes (referred to as partitions). To manage one or more logical volumes, a VSIT (Volume Set Information Table) is recorded at the beginning of the record area. The VSIT includes the number of volumes recorded on the tape and position information of the logical volumes on the tape. The position information includes start physical IDs and end physical IDs of DITs (Directory Information Tables) of up to 1024 logical volumes.

The position at the beginning of the VSIT is defined as the position of 0-ID. An ID (Identification) is an address corresponding to the position of every set of four tracks on the tape. IDs are simply incrementally assigned from the VSIT area to the DIT area of the last volume. The length of one VSIT is 1-ID.

A logical volume is composed of a DIT (Directory Information Table), a UIT (User Information Table), and a user data area. The DIT has information for managing a file in the logical volume. The length of one DIT is 40-IDs. The UIT is optional. The UIT is user information for managing a file.

In FIG. 7, hatched areas are run-up areas. With run-up areas, data tracks are servo-locked. Dotted areas are position tolerance areas. With the position tolerance areas, when the VSIT and the DIT are updated, valid data can be prevented from being erased.

Figure 8A:
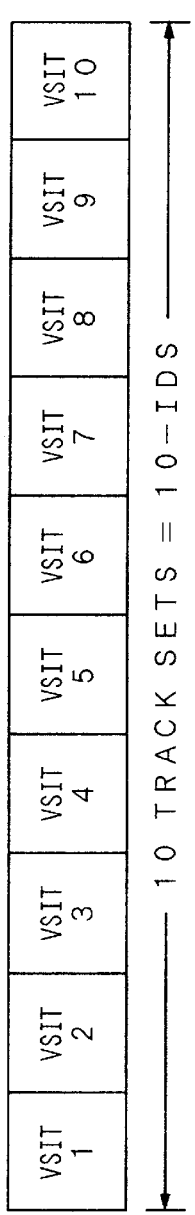
FIGS. 8A, 8B, and 8C are schematic diagrams showing formats of a VSIT and a DIT of the data recorder according to the present invention.

As shown in FIG. 8A, the VSIT is repeatedly recorded ten times so as to improve the reliability of data. Thus, the VSIT area is composed of 10 track sets (=10-IDs). The VSIT area is followed by a retry area composed of 90 track sets or more.

Figure 8B:
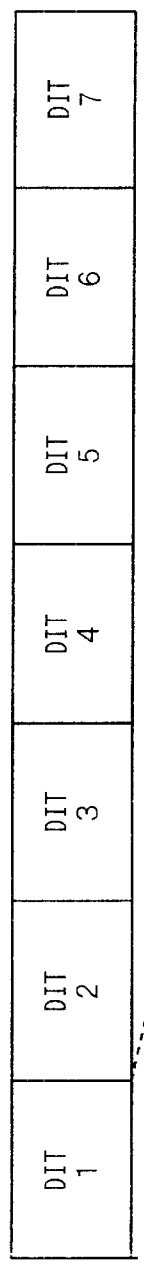
Figure 8C:
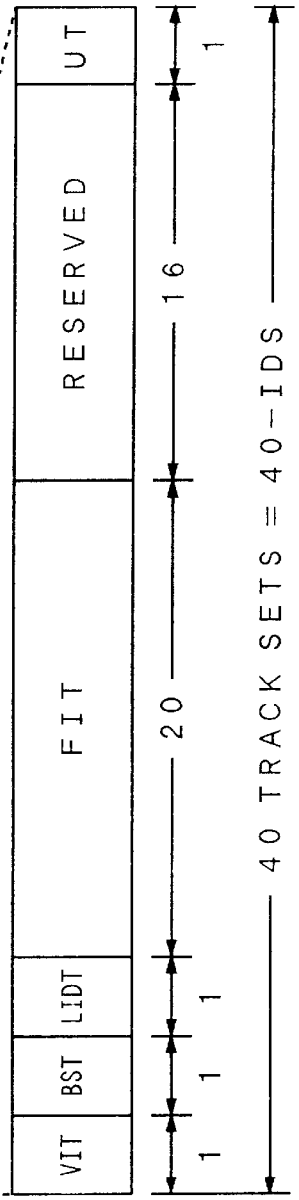

As shown in FIG. 8B, the DIT is repeatedly recorded seven times. As shown in FIG. 8C, the DIT is composed of six tables. The six tables are a VIT (Volume Information Table), a BST (Bad Spot Table), an LIDT (Logical Information Table), an FIT (File Information Table), a UT (Update Table), and a UIT (User Information Table) disposed in the order. Each of the VIT, the BST, the LIDT, and the UT has the length of 1-ID. The FIT has the length of 20-IDs. The remaining area for 16-IDs is reserved.

Next, each table of the DIT will be described. The ID address of the VIT is a physical ID at the beginning of volumes written in the VSIT. The logical ID of the VIT is equivalent to the physical ID at the beginning of the volumes written in the VSIT. The VIT includes a volume label and volume information such as a start physical ID of the first data block in the physical volume and the last physical ID thereof.

Figure 9:
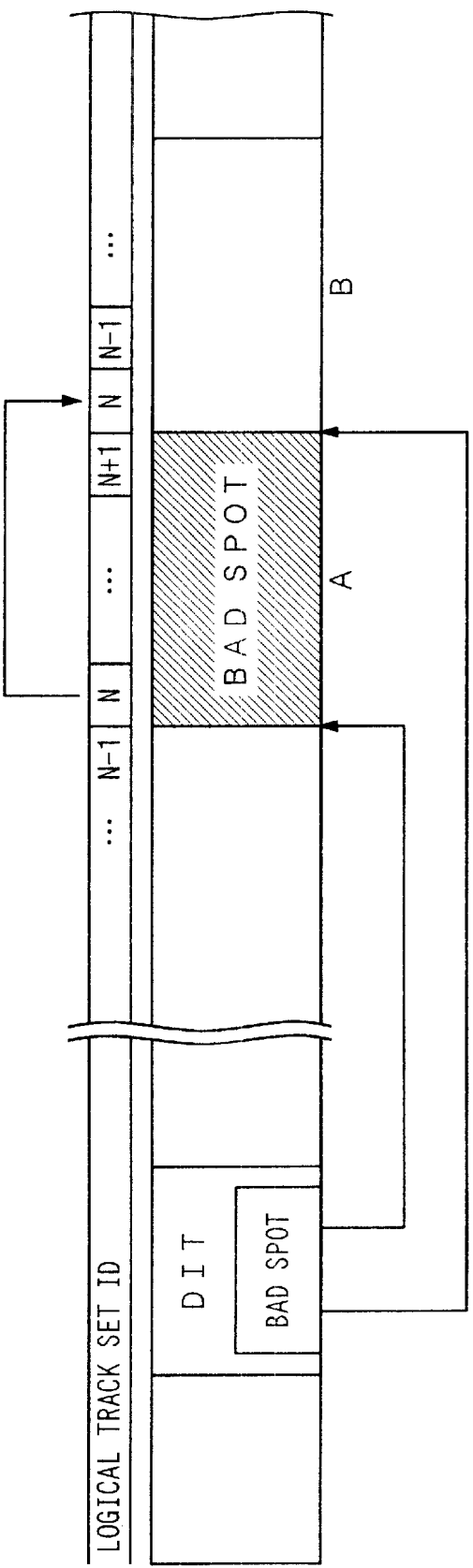
FIG. 9 is a schematic diagram for explaining a BST of the data recorder according to the present invention.

The ID address of the BST is the physical ID of the VIT plus 1, whereas the logical ID thereof is the logical ID of the VIT plus 1. The BST has position information of logically invalid data. The logically invalid data is data that is treated invalid because of presence of the same track set ID. For example, as shown in FIG. 9, a hatched area A is logically invalid data. A write retry operation and a write operation associated therewith cause logically invalid data. When a write operation is performed, if an error takes place, a write retry is automatically performed and an error location thereof is output. The error location is stored in the BST. When a read operation is performed, the BST represents an invalid area. The logically invalid data is also referred to as bad spot. The BST can manage top physical IDs and last physical IDs of up to 14592 bad spots.

The ID address of the LIDT is the physical ID of the VIT plus 2, whereas the logical ID thereof is the logical,ID of the VIT plus 2. The LIDT is a data table for a high speed block space and a locating operation. In other words, the LIDT includes logical IDs and physical IDs of pointers 1 to 29, file numbers, and the first block number of the ID data in the block management table. FIG. 15 shows the contents of the LIDT.

The ID address of the FIT is the physical ID of the VIT plus 3, whereas the logical ID thereof is the logical ID of the VIT plus 3. The FIT is composed of a plurality of pairs of two types of data corresponding to tape marks. The tape marks are file delimiter codes. The N-th data pair accords with an N-th tape mark counted from the beginning of the volume. One data of each pair is the physical ID of the N-th tape mark. The other data of the pair is the absolute block number of the tape mark N. This value is the absolute block number of the last block with the same file number as the tape mark. With the physical ID and the absolute block number of the tape mark, the position of the tape mark can be precisely detected. Thus, a desired physical position on the tape can be accessed at a high speed. FIG. 16 shows the contents of the FIT.

The ID address of the UT is the physical ID of the VIT plus 39. The UT is information that represents whether or not a volume has been updated. Before a volume has not been updated, a word (four bytes) that represents the update status of the UT is FFFFFFFFh (h represents hexadecimal notation). After a volume has been updated, the word is 00000000h.

The UIT is optional. The UIT is an area of for example 100-IDs. The UIT is a user accessible data table for storing a user header.

Figure 10:
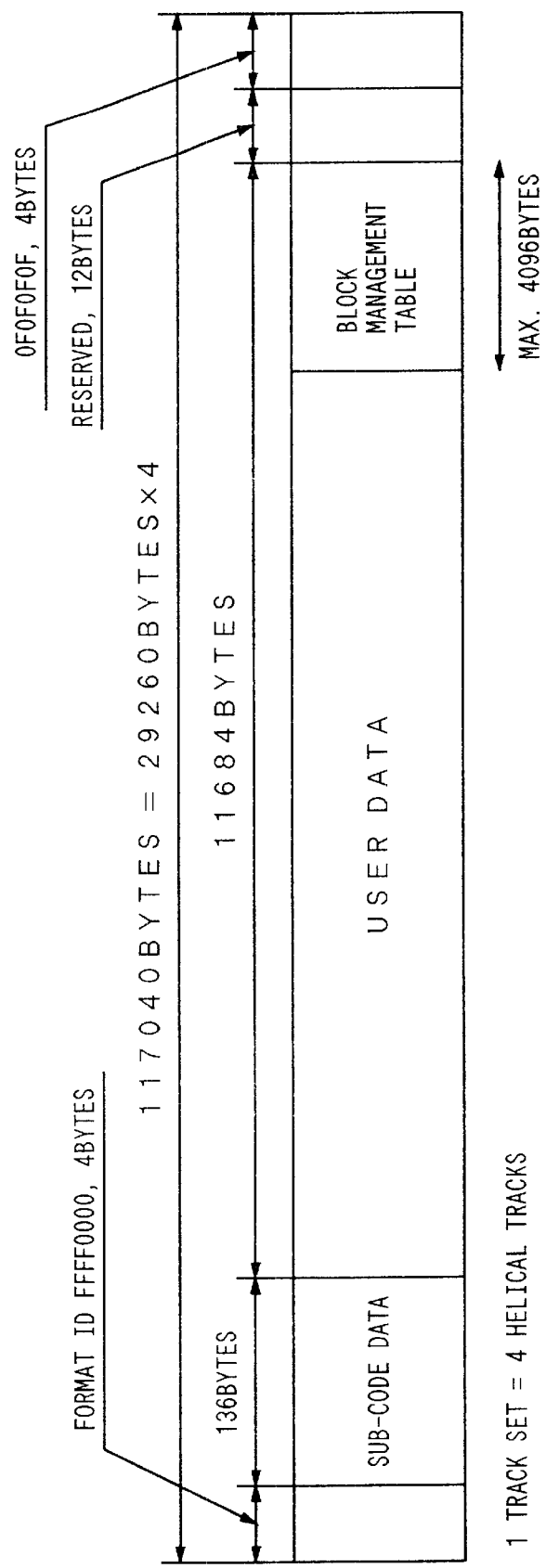
FIG. 10 is a schematic diagram for explaining a logical format of the data recorder according to the present invention.

In this example, 1-ID is assigned to each track set composed of four helical tracks. The logical structure of a data block is defined for each track set. FIG. 10 shows the structure of a logical track set. The first four bytes of the logical track set are used for a format ID that is FFFF0000h.

The next 136 bytes (34 words) are used for an area for sub-code data. The sub-code data is management information of a track set. The sub-code data includes for example the above-described tables (such as VSIT, VIT, and BST) and ID codes (such as user data and tape marks).

The bytes of which the length of the block management table is subtracted from the next 116884 bytes are used for a user write area. When the track set is used for a user data write area, if the size of the user data is smaller than the size of the user data write area, dummy data is filled in the rest of the area. There are four types of track sets defined in the user data area, namely, a user data track set used for writing user data, a tape mark (TM) track set for representing a tape mark, an EOD (End of Data) track set for representing EOD, and a dummy track set for representing dummy data. For each track set type, a sub-code and a block management table are defined.

User data is followed by the block management table area. The length of the block management table is up to 4096 bytes. The last four bytes of the track set are used for a last code (0F0F0F0Fh) of the track set. The last code is preceded by a reserved area of 12 bytes. The block management table is used to manage the structure of a data block of user data. FIG. 13 shows the contents of the block management table.

Figure 11:
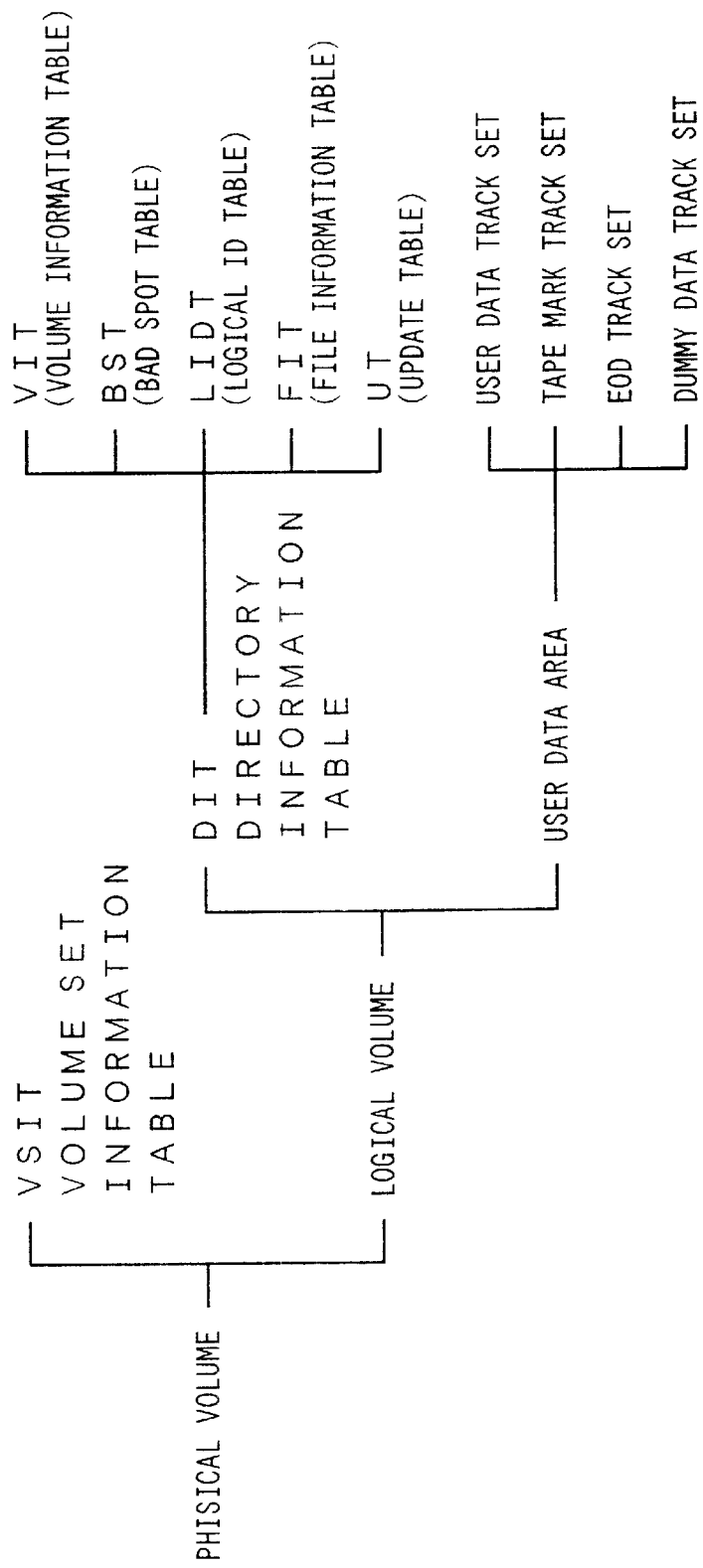
FIG. 11 is a schematic diagram for explaining a format structure of the data recorder according to the present invention.

FIG. 11 shows a logical format of the data recorder. The VSIT is recorded for each physical volume such as one volume of tape. A DIT is recorded for each logical volume (partition). The DIT includes five tables that are a VIT, a BST, an LIDT, an FIT, and a UT. In addition, the DIT includes a UIT as an option. The user data area includes four types of track sets that are a user data track set, a tape mark track set, an EOD (End Of Data) track set, and a dummy track set.

Next, an example of the data structure of the above-descried DIT will be described. FIG. 12 shows the contents of a sub-code area of the VIT in the DIT. A tape initial number (tape unique value assigned upon initialization of the tape) is written as word 14 of the sub-code area. FIG. 13 shows the contents of the block management table of the DIT. Each block management table is composed of four words. FIG. 14 shows the contents of the VIT. FIG. 15 shows the contents of the LIDT. FIG. 16 shows the contents of the VIT. As shown in FIG. 14, the initial number of a volume (unique value of a tape assigned upon initialization of a volume) is written to word 255 of the VIT. As described above, the N-th data pair of the FIT accords with an N-th tape mark counted from the beginning of the volume. The data pair is composed of a physical ID of the N-th tape mark and the absolute block number of the N-th tape mark.

Next, the operation of the above-described data recorder will be briefly described. When a tape is used at the first time, the tape should be initialized. In the initializing operation of the tape, a VSIT, a DIT, and an EOD are written to predetermined positions of the tape. In addition, dummy data is written to the tape. Moreover, the physical IDs (which are above-described time codes) are written so that they simply increment from the LBOT and the physical ID at beginning of the VSIT is 0-ID.

Before data is written to or read from a tape, the tape is loaded into the data recorder. After the tape is inserted, by pressing the button 3, the loading operation is performed. When the loading operation is performed, a VSIT and a DIT are read from the tape. To stop reading/writing data from/to the tape, by pressing the button 3, the tape is unloaded from the data recorder. When the unloading operation is performed, the VSIT and the DIT are rewritten. The loading operation and the unloading operation can be performed by issuing respective commands instead of the operation of the button 3.

Figure 17:
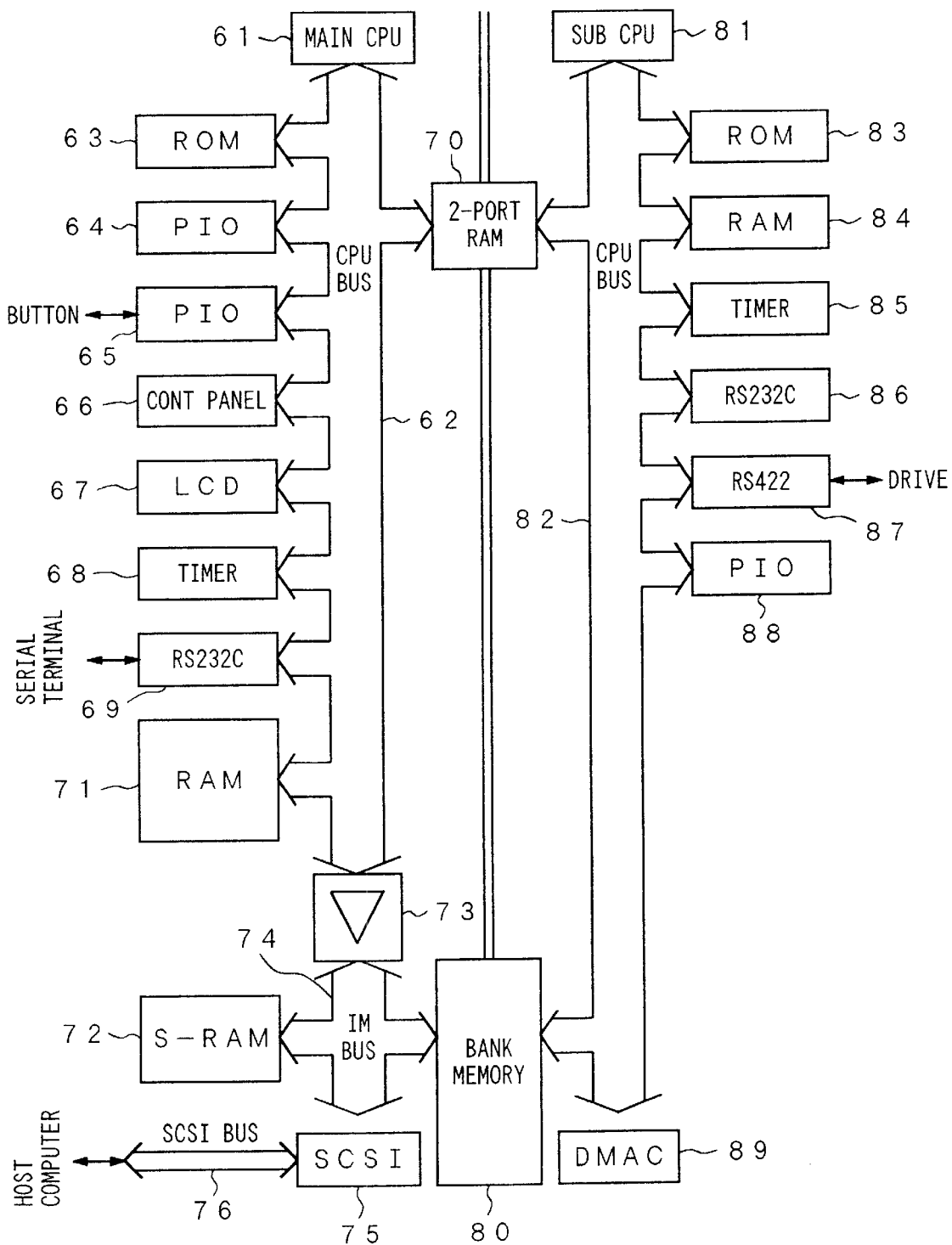
FIG. 17 is a detailed block diagram showing the system structure of the data recorder according to the present invention.

FIG. 17 is a block diagram showing a system structure of the tape drive controller 1. Reference numeral 61 is a main CPU. Reference numeral 70 is a two-port RAM. Reference numeral 80 is a bank memory. Reference numeral 81 is a sub CPU. The main CPU 61 is a CPU that manages the entire system. In association with the main CPU 61, a CPU bus 62 is disposed. Each structural portion of the tape drive controller 1 is connected to the CPU bus 62. In other words, a ROM (flash ROM) 63, PIOs (parallel I/Os) 64 and 65, a control panel 66, an LCD 67, a timer 68, an RS232C interface 69, a two-port RAM 70, and a RAM 71 are connected to the CPU bus 62.

The PIO 65 is connected to a button on the front panel. The LCD 67 is a display unit that displays the operation state of the drive so that the user can know it. The RS232C interface 69 is connected to a serial terminal. The RAM 71 is a work RAM for use with firmware. The RAM 71 has a down-load area of programs and an area for temporarily storing header information (VSIT/DIT).

An IM bus 74 is connected to the CPU bus 62 through a unidirectional controlling device 73. An S-RAM 72, a bank memory 80, and an SCSI controller 75 are connected to the IM bus 74. The host computer is connected to the SCSI controller 75 through a bus 76. The S-RAM 72 is a back-up RAM with a condenser. The S-RAM 72 is used for a script memory (for storing a control program for the SCSI controller). In addition, the S-RAM 72 is used for a logger memory for representing a real operation state of the system. Since this memory is backed up with the condenser, after the power of the system is turned off, the memory can hold data for around two days.

The two-port RAM 70 stores five types of packets for communicating information between the two CPUs 61 and 81. The five types of packets are:

Command transmission packet: This packet is used when the main CPU 61 requests the sub CPU 81 to perform an operation.

End status reception packet: This packet is used when the CPU 81 completes an operation corresponding to a command requested by the CPU 61 and sends an end status to the CPU 61.

Command status: This flag is used to represent the progress status of a command.

Drive management status table. This table is used when the CPU 81 sends the status of the drive to the CPU 61. This table is rewritten by the CPU 81 at predetermined periods.

Data send/receive packet. This packet is a buffer and is used when the firmware on the drive (recorder) side is down-loaded through the SCSI bus or when a diagnosis on the drive side is activated with the serial port of the CPU 61. The bunk memory 80 is a buffer memory for data.

The sub CPU 81 is a CPU that controls the drive. In association with the sub CPU 81, a CPU bus 82 is disposed. The CPU bus 82 is connected to a ROM (flash ROM) 83, a RAM (work RAM) 84, a timer 85, an RS232C interface 86, an RS422 interface 87, a PIO 88 (used for inputting and outputting data to and from the processor), and a DMA controller 89. In addition, the CPU bus 82 is connected to the two-port RAM 70 and the bank memory 80.

The bank memory 80 stores data that is written to the tape or data that is read therefrom. The bank memory 80 has for example eight memory banks in which write data or read data is stored. The DMA (Direct Memory Access) controller 89 stores data written to the drive to the bank memory 80. The RS232C interface 86 is used for a self diagnosis. The RS422 interface 87 is a communication means with the drive.

The present invention relates to the loading process and the unloading process performed when a tape is loaded and unloaded to/from the data recorder. Before explaining the present invention, with reference to FIG. 18, the process performed by the above-described data recorder will be described.

When a tape is loaded, the information of the DIT is read to the RAM 71. Thus, the ID of the TM position of each file included in the FIT is stored in the RAM 71. Corresponding to the ID of the TM position, the top position of a desired file is detected.

For example, FIG. 18A shows a tape position in the case that no operation is performed. In FIG. 18A, an arrow mark represents the position of the access pointer. The present position of the access pointer is for example the head position when the tape is loaded. Thus, the present position of the access pointer is not constant. When the top position of the second file is detected, the host computer sends a rewind request to the data recorder. The rewind request is received by the SCSI controller 75.

In this case, the real tape rewind control signal is not output to the digital information recorder 2. Instead, as shown in FIG. 18B, the ID of the top position of the first file is stored on a tape position management table in the RAM 71. When the tape top position is stored in the RAM 71, an acknowledge signal is sent to the host computer side. Thereafter, the tape drive control side receives a top position detecting request from the host computer (so as to skip the first file and detect the second file).

In this case, as shown in FIG. 18C, the tape is not actually traveled. Instead, a target position (namely, the ID (denoted by\*) of the TM of the first file) is written on the tape position management table in the RAM 71. Thereafter, the tape drive controller sends an acknowledge signal to the host computer. Next, the host computer sends a write request or a read request to the tape drive controller. When the tape drive controller receives the request, it sends a real tape travelling command to the digital information recorder 2. Thus, as shown in FIG. 18D, the digital information recorder 2 travels the tape until the access pointer matches the target position. When the access pointer matches the target position, the digital information recorder 2 stops traveling the tape.

When the access pointer matches the target position\*, the digital information recorder 2 sends an acknowledge signal to the host computer. The digital information recorder 2 starts the writing operation or the reading operation from the position of the access pointer.

In the top position detecting process for the above-mentioned proposed data recorder, only when the host computer sends a write request or a read request to the data recorder, it actually travels the tape. Thus, the rewind process for rewinding the tape to the tape top position can be omitted. Consequently, the top position detecting process can be quickly performed and the tape damage can be reduced.

However, in the top position detecting process for the proposed data recorder, when the tape is actually traveled, the present tape position is not defined. Thus, when the traveling distance from the present position to a target position is long, it takes a long time to travel the tape to the target position. Particularly, in the case of a large capacity magnetic tape unit, the long traveling time adversely affects the operation thereof. Generally, the host computer side defines a time-out for each command. Thus, when the traveling time is long, a time-out error may occur.

According to the present invention, the problem of time-out error can be solved. FIGS. 19A to 20C show an operation of an embodiment of the present invention. FIG. 21 is a flow chart showing a process performed by the main CPU 61. When the main CPU 61 controls the drive side, the main CPU 61 sends a request to the sub CPU 81 through the two-port RAM 70. The sub CPU 81 receives the request and sends a control signal to the drive through the RS422 (87).

When the tape is loaded, the present position is sent to the two-port RAM 70 through the RS422 (87) and the sub CPU 81. The main CPU 61 causes the RAM 71 to store the information of the DIT. The ID of the TM position of each file included in the FIT is stored in the RAM 71. Corresponding to the ID of the TM position, the top position of a desired file is detected.

Figure 19A:
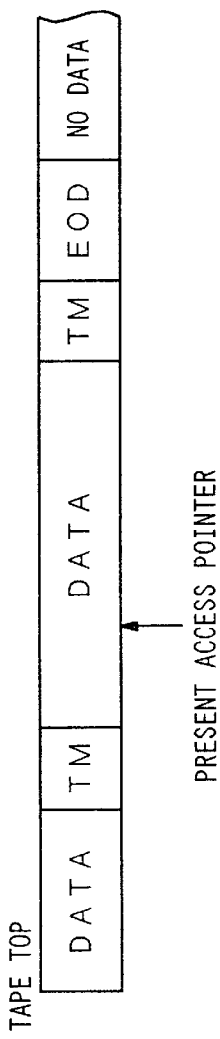
FIGS. 19A, 19B and 19C are schematic diagrams for explaining a top position detecting operation according to an embodiment of the present invention.
Figure 19B:
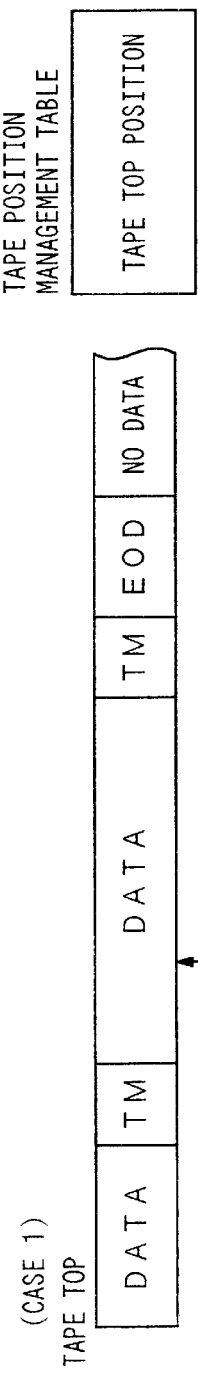
Figure 19C:
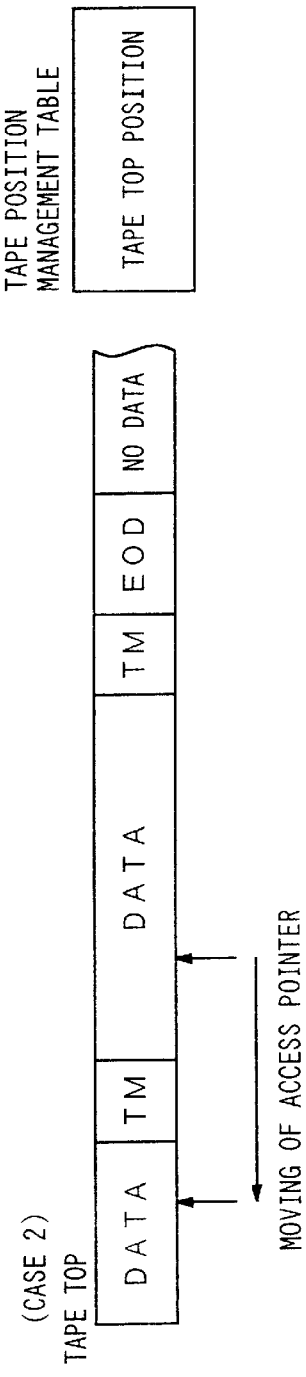
Figure 20A:
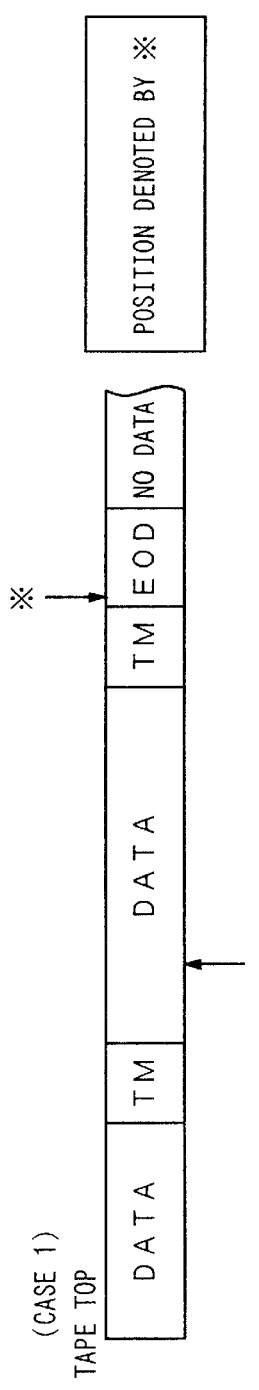
FIGS. 20A, 20B and 20C are schematic diagrams for explaining the top position detecting operation according to the embodiment of the present invention.

FIG. 19A shows the tape position in that case when no operation is performed. The main CPU 61 receives the rewind request from the host computer through the SCSI 75 (at step S1). The received rewind request is stored in the S-RAM 72. The main CPU 61 causes the tape top position included in the rewind request to be stored in the tape position management table of the RAM 71 (at step S2).

At step S3, it is determined whether or not the present position matches the tape top. In reality, the difference between the ID of the tape top and the ID of the present position is calculated and the result is compared with a predetermined value. In other words, the CPU 61 compares the difference between the ID of the data top stored in the RAM 71 and the ID of the present position stored in the two-port RAM 70 with the predetermined value. The predetermined value is a period of time for which the tape is traveled after the host computer issues a command and then determines that a time-out error takes place. For example, the predetermined value is two minutes.

As the determined result at step S3, there are two cases: (case 1) the present position is close to the tape top and (case 2) the preset position is far from the tape top. In the case 1, since the tape is not actually traveled, the flow advances to step S5 (see FIG. 19A). In the case 2, the access pointer is moved to a position between the present position and the tape top (for example, a nearly middle position therebetween) (at step S4) (see FIG. 19C).

When the main CPU 61 receives the top position detecting request from the host computer through the SCSI 75 (at step S5), the CPU 61 causes the S-RAM 72 to store the received top position detecting request. The target position included in the top position detecting request is stored in the tape position management table of the RAM 71 (at step S6). Thereafter, the flow advances to step S7. At step S7, it is determined whether or not the present position matches the target position. As with step S3, as a determination criterion, a predetermined value that is two minutes for which the tape is travelled is used. When the present position is close to the target position (in the case 1), as shown in FIG. 20A, the tape is not actually traveled. In this case, the process advances to step S9.

Figure 20B:
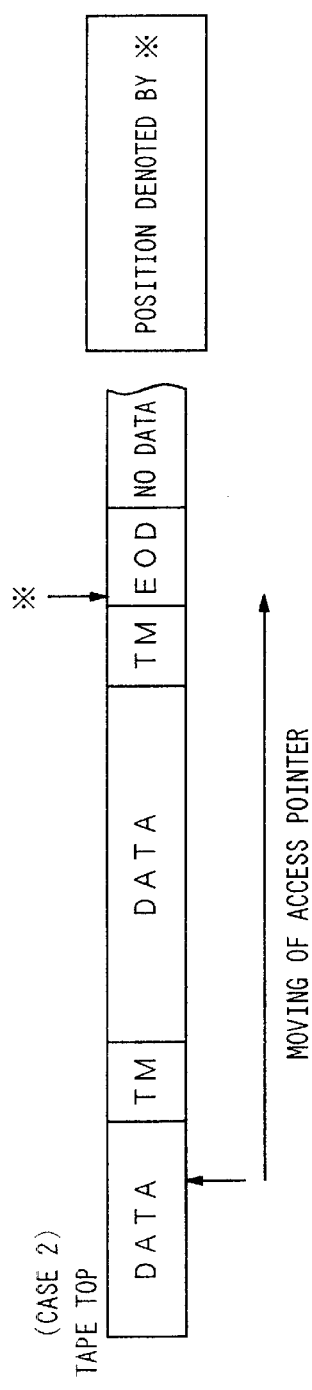
Figure 20C:
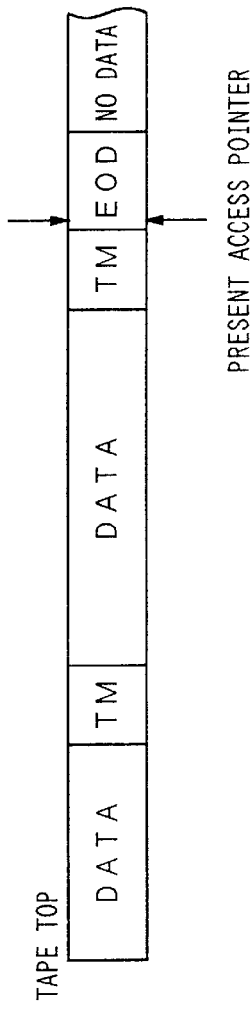
Figure 21:
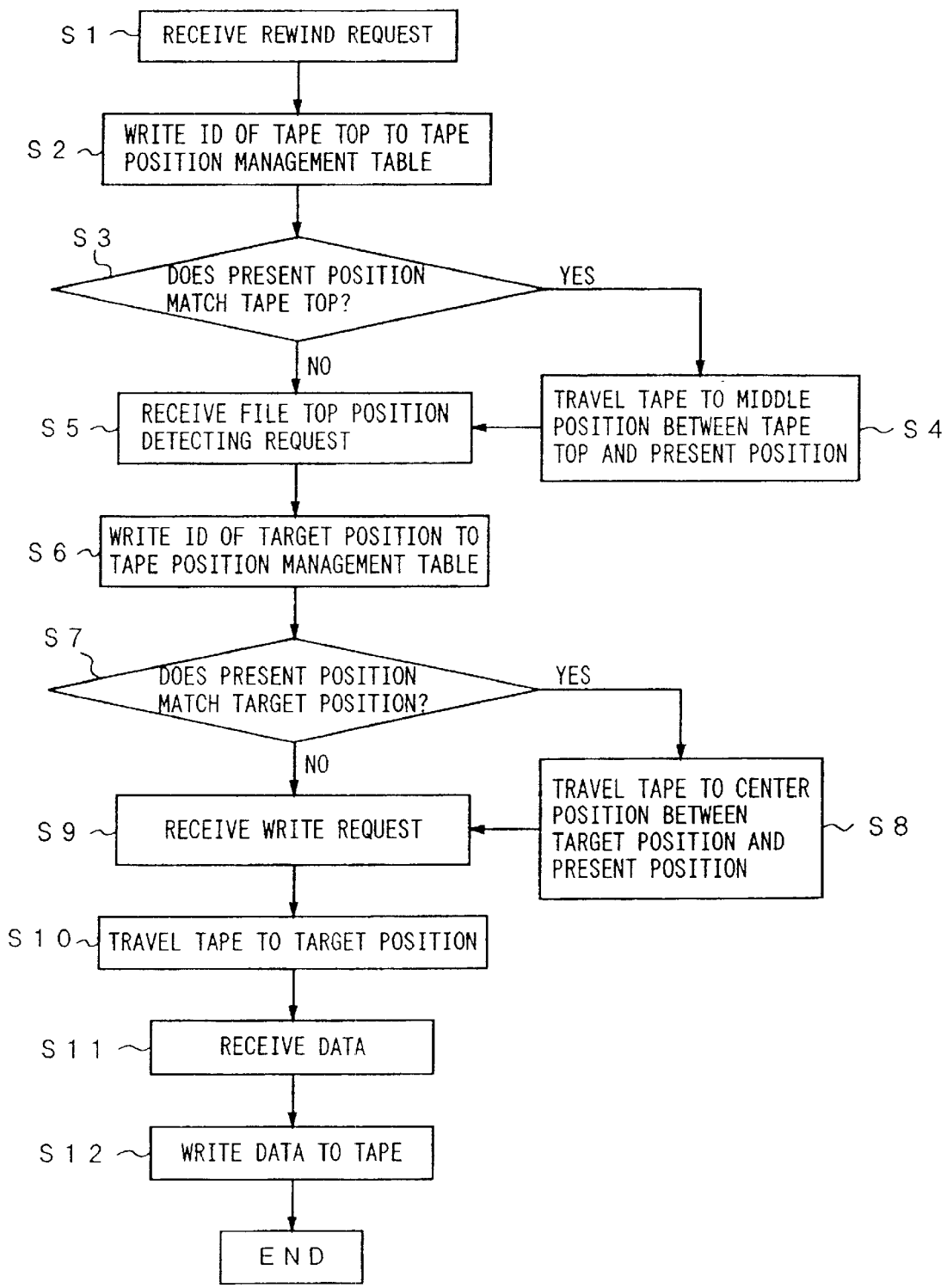
FIG. 21 is a flow chart for explaining the top position detecting operation according to the embodiment of the present invention.

When the present position is far from the target position (in the case 2), the tape is traveled to a position between the target position and the present position (for example, a nearly middle position therebetween) (at step S8) (see FIG. 20B). At step S9, when the main CPU 61 receives a write request from the host computer through the SCSI, the tape is traveled until the access pointer is moved to the target position (*) (at step S10) (see FIG. 20C). After the target position is detected, write data is received from the host computer (at step S11). At step S12, the data is actually written on the tape.

The present invention can be applied to a sequential access type data recorder as well as the rotating head type data recorder.

The data format having attributes of tape marks is not limited to that according to the above-described embodiment. Instead, various formats may be used.

According to the present invention, when any position on the tape is detected, it is not necessary to actually travel the tape, but change a value on the management table in the memory. Thus, unlike with the process for traveling the tape position upon occurrence of a tape position traveling request, the access speed can be increased and the tape damage can be reduced.

In addition, according to the present invention, when the present position is far from the target position, the tape is approached to the target position beforehand. Thus, in the host computer side, a time-out error can be prevented.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An apparatus for controlling the travelling of a tape in a data recording apparatus, the apparatus comprising:

means for receiving a travel request signal, the travel request signal including a target position representing a position on the tape at which data is to be recorded or reproduced;

means for identifying a present position of the tape;

means for calculating a difference between the present position and the target position to produce a difference value, and for determining if the difference value is larger than a predetermined value;

means for producing a control signal only if it is determined that the difference value is larger than the predetermined value;

means for moving the tape to a position between the target position and the present position only if the travel request signal is received and the control signal is produced;

means for receiving a write request signal indicating a request to record the data on the tape;

said means for moving the tape further being operable to move the tape to the target position when the write request signal is received; and means for recording the data on the tape after the tape is moved to the target position.

2. The apparatus of claim 1, wherein said means for moving moves the tape, if the travel request signal is received and the control signal is produced, to a position substantially halfway between the target position and the present position.

3. The apparatus of claim 1, wherein said predetermined value corresponds to a predetermined time-out period of time the tape is moved.

4. The apparatus of claim 1, wherein the travel request signal is a rewind request signal representing an initiation of a rewind operation or a fast-forward request signal representing an initiation of a fast-forward operation.

5. The apparatus of claim 1, further comprising:

means for receiving a rewind request signal, the rewind request signal including a tape top position representing a top position of the tape; and means for calculating a difference between the present position and the tape top position to produce a second difference value, and for determining if the second difference value is larger than a second predetermined value;

wherein said means for moving is operable to move the tape to a position between the tape top position and the present position only if it is determined that the second difference value is larger than the second predetermined value.

6. A method of controlling the travelling of a tape in a data recording apparatus, the method comprising the steps of:

receiving a travel request signal, the travel request signal including a target position representing a position on the tape at which data is to be recorded or reproduced;

identifying a present position of the tape;

calculating a difference between the present position and the target position to produce a difference value;

determining if the difference value is larger than a predetermined value;

producing a control signal only if it is determined that the difference value is larger than the predetermined value;

moving the tape to a position between the target position and the present position only if the travel request signal is received and the control signal is produced;

receiving a write request signal indicating a request to record the data on the tape;

moving the tape to the target position when the write request signal is received; and recording the data on the tape after the tape is moved to the target position.

7. The method of claim 6, wherein said first moving step is carried out by moving the tape, if the travel request signal is received and the control signal is produced, to a position substantially halfway between the target position and the present position.

8. The method of claim 6, wherein said predetermined value corresponds to a predetermined time-out period of time the tape is moved.

9. The method of claim 6, wherein the travel request signal is a rewind request signal representing an initiation of a rewind operation or a fast-forward request signal representing an initiation of a fast-forward operation.

10. The method of claim 6, further comprising the steps of:

receiving a rewind request signal, the rewind request signal including a tape top position representing a top position of the tape;

calculating a difference between the present position and the tape top position to produce a second difference value;

determining if the second difference value is larger than a second predetermined value; and moving the tape to a position between the tape top position and the present position only if it is determined that the second difference value is larger than the second predetermined value.

* * * * *